United States Patent [19]

Hermann

[11] Patent Number: 4,664,635

[45] Date of Patent: May 12, 1987

[54] SIMULATION DEVICE

[75] Inventor: Jürgen Hermann, Mauren, Liechtenstein

[73] Assignee: Divetronic AG, Liechtenstein

[21] Appl. No.: 775,372

[22] Filed: Sep. 12, 1985

[51] Int. Cl.$^4$ ............................................. G09B 9/00
[52] U.S. Cl. ........................................ 434/365; 73/4 R
[58] Field of Search ............... 417/306, 557; 434/254, 434/365; 604/70, 97, 98, 121, 125, 211, 224; 73/4 R

[56] References Cited

U.S. PATENT DOCUMENTS

| | | | |
|---|---|---|---|
| 2,024,967 | 12/1935 | Dierker | 604/121 |
| 2,263,865 | 11/1941 | Bailen | 604/125 |
| 2,283,915 | 5/1942 | Cole | 604/224 X |
| 2,388,661 | 11/1945 | Woodford | 417/557 X |
| 2,446,740 | 8/1948 | Burns | 73/4 R |
| 2,547,099 | 4/1951 | Smoot | 604/70 |
| 2,650,591 | 9/1953 | Love | 604/70 |
| 2,737,946 | 3/1956 | Hein | 604/70 |
| 3,279,659 | 10/1966 | Harris | 604/125 X |
| 3,281,023 | 10/1966 | Bruck | 604/211 X |
| 3,425,413 | 2/1969 | Stephens | 604/70 |
| 3,468,308 | 9/1969 | Bierman | 604/118 X |
| 3,945,379 | 3/1976 | Pritz | 604/70 |
| 4,328,698 | 5/1982 | Bruton | 73/4 R |
| 4,333,331 | 6/1982 | Mann | 73/4 R |
| 4,367,739 | 1/1983 | Laveen | 604/224 |
| 4,421,508 | 12/1983 | Cohen | 604/70 |

FOREIGN PATENT DOCUMENTS 1186053 4/1983 Canada .

Primary Examiner—William H. Grieb
Attorney, Agent, or Firm—Orrin M. Haugen; Thomas J. Nikolai; Frederick W. Niebuhr

[57] ABSTRACT

A test device for electronic pressure gauges used by underwater divers is described. The device, comprised of a pressure transmitter which is capable of being connected to the electronic pressure gauge's sensor, is used to simulate the pressure encountered during underwater diving outside of the underwater environment.

13 Claims, 1 Drawing Figure

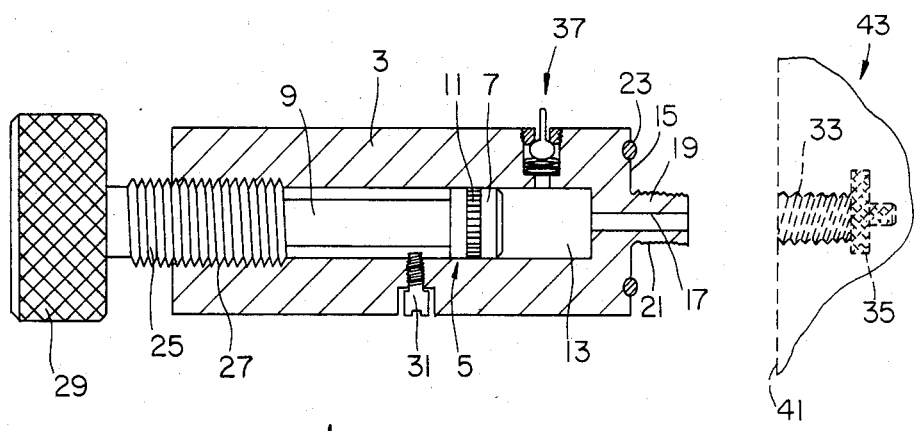

SIMULATION DEVICE

BACKGROUND OF THE INVENTION

The present invention concerns a simulation device. More particularly it relates to a device which is attached to an electronic pressure gauge used by underwater divers to test such gauges outside the underwater environment.

Disclosed in European Offenlegungsschrift 73 499 and Canada Pat. No. 11 86 053, respectively, is an electronic pressure gauge device which is capable of calculating and displaying various parameters of a diving maneuver. This gauge has a memory; a timer or clock; a pressure sensor; processing means; and a display. The memory is used to store decompression parameters associated with a series of diving depths and diving times. Used for both air and water pressure, and capable of being switched over to both ranges, is a single, preferentially a piezoresistive pressure sensor. The processing means receive input values from the pressure sensor and the clock. It then compares these values with the parameters stored in the memory. The gauge is capable of displaying at any point in time during a diving maneuver the total required diving time, including the necessary decompression pauses. This is a function of the depths passed through in diving as well as time of entering into a new diving depth stage. The gauge is also capable of displaying warning signals whenever the maximum ascending time is exceeded, whenever a decompression pause is reached, and whenever the device becomes inoperative by exceeding the allowable times or depth.

Electronic pressure gauges of the type described above permit a diver to be continually informed, in complete safety, concerning all essential parameters during a diving maneuver. These previously known devices, working electronically with a computer or microprocessor, are capable of being carried along on the forearm of the diver during diving. Relatively recently such devices have enjoyed great acceptance.

With such electronic pressure gauges, however, there is always the disadvantage of not having available an appropriate demonstration simulator for testing the device or instructing new users regarding its operation. The present invention is directed to this problem.

SUMMARY OF THE INVENTION

One object of the present invention is to provide a means used in conjunction with a diver's electronic pressure gauge to simulate various pressures associated with diving maneuvers.

Another object of the invention is to provide means for testing an electronic pressure gauge by simulating various pressures associated with diving.

Still another object is to provide means for instructing one in the use of a diver's electronic pressure gauge by providing an apparatus used in conjunction with such a gauge for simulating various pressures encountered while diving.

Obtained through the present invention, in surprising manner and fashion, with the simplest of means, is a simulation device with which computer controlled electronic pressure gauge devices for underwater diving maneuvers can be demonstrated or tested. The simulation device consists of a pressure transmitter that is capable of being connected in air- or water-tight fashion to the housing of an electronic pressure gauge device in the area of the gauge's pressure sensor. A diving or a dive-ascent maneuver can be simulated directly with the simulation device of the present invention by changing the pressure that is acting on the pressure sensor of the pressure gauge.

In a preferred embodiment of the invention, the simulation device consists of a pressure transmitter including a piston housing, pressure piston held internally in displaceable fashion therein, an outlet from the pressure chamber located at the front end of the piston housing, a conduit extending from said outlet, and means for connecting said conduit to the electronic pressure gauge in the area of its pressure sensor.

In the preferred embodiment, the means for connecting the conduit to the electronic pressure gauge includes outside threading on the conduit. By means of this threading, the conduit can be directly screwed into the housing of the pressure gauge in an appropriate threaded hole, underneath or inside of which the pressure sensor of the gauge is disposed. A sealing ring can also be included as part of the connecting means to produce a pressure-tight connection.

To enable fine adjustment of the pressure transmitter or a continuous change for the purpose of simulating a diving maneuver, the piston rod moving the piston head within the piston housing and a portion of the interior of the piston housing may be threaded. In this fashion, by rotating a handwheel, which is secured to the piston rod and disposed on the outside of the piston housing, the piston can be turned in and out of the piston housing in continuous and finely metered fashion to increase or decrease the pressure inside the piston housing and conduit forward of the piston and to change the amount of pressure applied to the sensor on the electronic pressure gauge.

A safety stop is provided so that in one end position the pressure piston can never be completely removed from the housing.

The device of the present invention can also be provided with a pressure relief valve leading from the pressure chamber to the outside. Actuating this relief valve will simulate a sudden drop in pressure which, for example, corresponds to the situation which occurs when a diver is ascending too fast. If the electronic pressure gauge is working properly an indicator lights up. When the gauge is in actual use, this light would signal the diver to ascend more slowly.

The foregoing explained simulation device can operate using air pressure or, if desirable, liquid pressure by first filling the pressure chamber with a liquid via the outlet opening.

Further advantages, particulars and features of the invention are obtained in the following from the example of embodiment represented with the aid of a drawing.

DESCRIPTION OF THE DRAWING

Shown in the drawing in a longitudinal cut is a simulation device of the present invention as well as a portion of a pressure gauge to be tested.

DESCRIPTION OF THE PREFERRED EMBODIMENT

The simulation device of the present invention consists of a pressure transmitter 1 and means to secure the pressure transmitter to a gauge to be tested in the area of the gauge's pressure sensor. The pressure transmitter 1 is comprised of a piston housing 3, a piston 5, and an outlet 17 which runs through a conduit 19. This conduit can be made out of either a flexible or rigid material.

The piston 5 is comprised of a piston head 7, a piston rod 9, and a handwheel 29. Piston head 7 and a portion of piston rod 9 are guided in internally displaceable fashion in an axial direction inside the piston housing 3. The piston head 7, which is secured to one end of the piston rod 9, is provided, at its outer circumference, with a sealing ring 11. This ring precludes any liquids or gases in the pressure chamber 13 from flowing past the piston head. Handwheel 29 is fixedly secured to the other end of piston rod 9.

The piston rod 9 is provided, at least over part of its length, with an external threading 25 which engages a corresponding internal threading 27 on the inside of the piston housing 3. Using the handwheel 29, one can turn the piston rod 9 and the piston head 7 into and out of the piston housing 3 to make pressure chamber 13 either smaller or larger. This has the effect of increasing or decreasing the pressure in the chamber 13. Secured to the front end 15 of the piston housing 3 is a conduit 19 through which an outlet 17 runs. The conduit 19 is provided with an outer threading 21 which is used to secure it to the gauge to be tested. The front side 15 of the piston housing 3 also has secured to it another sealing ring 23 which surrounds the conduit 19.

Also associated with the piston housing 3 are stop means 31 which preclude inadvertent or accidental removal of the piston from the piston housing. Stop means 31 are comprised of a safety screw which projects through the housing 3 and into the open area behind the piston head. The safety screw prevents piston head 7 from being pulled completely out of housing 3 unless the safety screw 31 is first removed.

A pressure valve 37 is also associated with the piston housing 3. Valve 37 is located within a passage which runs between pressure chamber 13 and the exterior of the housing 3. If desired, the pressure valve 37 can be opened from the outside of the housing to relieve pressure inside the chamber by pressing on the valve's stem. This valve is similar to the valves used in connection with pneumatic tires. This valve permits simulation of a diving ascent which is too rapid since opening the valve will create a significant and sudden drop in pressure inside the pressure chamber.

Additionally shown in the FIGURE is a portion of the housing 41 of the gauge 43 to be tested. The portion of the gauge shown includes a screw hole 33 behind which is disposed a measuring membrane of the pressure sensor 35.

When in use, the simulation device 1 is secured to the gauge 43 by screwing the threaded portion of conduit 19 into the threaded hole 33 of the gauge until a seal is formed by the sealing ring 23 between the piston housing 3 of the simulation device 1 and the outer housing 41 of the gauge 43 being tested. Once a proper seal between the two housings is created, the pressure acting directly upon the pressure sensor 35 can be raised or lowered by turning the thumbwheel 29 which is secured to the piston rod 9.

As discussed above, the simulation device can be actuated during use with either air or a liquid such as water. Higher pressure differences, with a given volume can be simulated by using water since water is less compressible than air. Thus, by using water it is possible to simulate greater pressure differences with a smaller piston stroke. Of course, the dimensions of the device can be varied so that pressure simulation can also be carried out with air in the desired ranged without problems.

I claim:
1. Simulation device for an electronic indicating device (43), said indicating device comprising a memory and a pressure sensor (35) for sensing the parameters of a diving maneuver and disposed inside a fluid-tight housing (41), characterized by the fact that the simulation device includes a pressure transmitter (1) having a pressure chamber (13), and a pressure line for connecting said chamber (13) with respect to said housing (41), in fluid-tight relation with said housing (41), and in fluid communication with said pressure sensor (35), said pressure transmitter (1) selectively varying the pressure of a pressure medium contained within said pressure chamber (13) and said housing (41) to simulate, at said pressure sensor, the parameters of said diving maneuver, such that the pressure chamber (13) of the pressure transmitter (1) is in fluid communication with the pressure sensor (35).

2. Simulation device according to claim 1, characterized in that the pressure transmitter (1) consists of a piston housing (3) with a piston (5) held internally in displaceable fashion, and includes an outlet opening (17) for the pressure medium for pressure stressing the pressure sensor (35).

3. Simulation device according to claim 2, characterized by the fact that the outlet (17) is disposed on the front side lying opposite to the piston head (7) inside the piston housing (3).

4. Simulation device according to claim 2, characterized by the fact that the outlet (17) is constructed as an outlet stub (19) projecting out over the front end of the piston housing (3).

5. Simulation device according to claim 4, characterized by the fact that the outlet stub (19) is provided with an external screw threading (21).

6. Simulation device according to claim 2, characterized by the fact that the outlet (17) and/or the outlet stub (19) is surrounded in the area of the associated front end of the piston housing (3) by a sealing ring (23).

7. Simulation device according to claim 3, characterized by the fact that the piston head (7) is provided with a sealing ring (11) running about in the circumferential direction.

8. Simulation device according to claim 2, characterized by the fact that the piston rod (9) projecting out over the piston housing (3) is provided with an external threading (25), that said piston housing (3) is provided in an internal threading (27) for the purpose of longitudinal displacement of the piston (5) by rotation thereof.

9. Simulation device according to claim 2, characterized by the fact that there is provided a handwheel (29) on the end of the piston rod (5) projecting outwardly of the piston housing (3).

10. Simulation device according to claim 9, characterized by the fact that there is installed, perpendicularly to the axial direction of the piston rod (5) a safety screw (31) as an end position stop for the piston head (7), separated from the pressure chamber (13) by the piston head (7) and projecting behind this latter.

11. Simulation device according to claim 10, characterized by the fact that the piston (5), with said safety screw (31) retracted, is completely removable from the piston housing (3) in the direction of said handwheel (29).

12. Simulation device according to claim 1, characterized by the fact that the pressure chamber (13) is provided with a pressure valve (37) leading to the outside and capable of being actuated from the outside.

13. Simulation device according to claim 2, characterized by the fact that the piston housing (3) and/or the piston (5) consist of plastic.

* * * * *